(12) United States Patent
Kohzaki (10) Patent No.: US 10,710,248 B2
(45) Date of Patent: Jul. 14, 2020

(54) ROBOT

(71) Applicant: FANUC CORPORATION, Yamanashi (JP)

(72) Inventor: Shigeru Kohzaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 250 days.

(21) Appl. No.: 15/587,732

(22) Filed: May 5, 2017

(65) Prior Publication Data

US 2017/0368695 A1    Dec. 28, 2017

(30) Foreign Application Priority Data

Jun. 23, 2016   (JP) ................................ 2016-124108

(51) Int. Cl.
*B25J 17/00*  (2006.01)
*B25J 9/12*   (2006.01)
*B25J 19/00*  (2006.01)

(52) U.S. Cl.
CPC .............. *B25J 17/00* (2013.01); *B25J 9/126* (2013.01); *B25J 19/0054* (2013.01); *Y10S 901/23* (2013.01); *Y10S 901/28* (2013.01)

(58) Field of Classification Search
CPC ......... B25J 19/0054; B25J 17/00; B25J 9/126
USPC ............. 454/185; 165/214, 74, 59; 312/236; 310/63, 62, 60 A
See application file for complete search history.

(56) References Cited

U.S. PATENT DOCUMENTS

| 4,678,952 | A | | 7/1987 | Peterson et al. |
| 6,130,491 | A | * | 10/2000 | Mitamura ............. F04D 29/281 |
| | | | | 310/62 |
| 7,282,823 | B2 | * | 10/2007 | Hilton .................. H02K 1/2786 |
| | | | | 310/261.1 |

FOREIGN PATENT DOCUMENTS

| CN | 203936920 U | 11/2014 |
| CN | 205219156 U | 5/2016 |
| JP | S56-015686 U | 2/1981 |
| JP | H04-251678 A | 9/1992 |
| JP | H07-112394 A | 5/1995 |
| JP | H08-168990 A | 7/1996 |
| JP | H09-323286 A | 12/1997 |

(Continued)

OTHER PUBLICATIONS

Japanese Decision to Grant a Patent dated Nov. 6, 2018, in connection with corresponding JP Application No. 2016-124108 (6 pgs., including machine-generated English translation).

(Continued)

*Primary Examiner* — Randell J Krug
(74) *Attorney, Agent, or Firm* — Maier & Maier, PLLC (57) ABSTRACT

A robot including: a driving mechanism that drives a movable member with respect to a base; and a fan that cools the driving mechanism, wherein the driving mechanism is provided with a motor, and a reducer that is disposed between the base and the movable member and that moves the movable member with respect to the base by reducing the speed of the rotation of the motor, the motor and the reducer are disposed on either side of a securing plate that is secured to the base, the cooling fan is disposed on an opposite side from the securing plate with the motor interposed between the fan and the securing plate, a space in which a surface of the reducer is exposed is formed outside the reducer, and the (Continued)

securing plate is provided with a vent that is connected to the space by passing through the securing plate.

4 Claims, 6 Drawing Sheets

(56) References Cited

FOREIGN PATENT DOCUMENTS

| | | |
|---|---|---|
| JP | H10-337685 A | 12/1998 |
| JP | H11-077563 A | 3/1999 |
| JP | 2013-126275 A | 6/2013 |
| JP | 2015-6711 A | 1/2015 |
| JP | 2015-130764 A | 7/2015 |
| JP | 5817787 B2 | 11/2015 |
| WO | WO-9745234 A1 * 12/1997 | .......... B25J 19/0054 |

OTHER PUBLICATIONS

Japanese Office Action dated May 29, 2018 in corresponding Japan application No. 2016-124108; 6 pgs.
Search Report dated May 17, 2018 in corresponding Japan application No. 2016-124108; 14 pgs.
Office Action dated Feb. 22, 2019 in corresponding Chinese Application No. 201710338307.6; 9 pages.

* cited by examiner

ROBOT

CROSS-REFERENCE TO RELATED APPLICATIONS

This application is based on Japanese Patent Application No. 2016-124108, the contents of which are incorporated herein by reference.

TECHNICAL FIELD

The present invention relates to a robot.

BACKGROUND ART

In the related art, there is a known robot provided with, in order to enhance the continuous operating capability, a structure in which a cooling fan is mounted on a motor in a driving portion, and the motor is cooled by means of an airflow (for example, see Patent Literatures 1 to 3).

CITATION LIST

Patent Literature

{PTL 1} Publication of Japanese Patent No. 5817787
{PTL 2} Japanese Unexamined Patent Application, Publication No. Hei 10-337685
{PTL 3} Japanese Unexamined Patent Application, Publication No. Hei 8-168990

SUMMARY OF INVENTION

Solution to Problem

An aspect of the present invention provides a robot including: a driving mechanism that drives a movable member with respect to a base; and a cooling fan that cools the driving mechanism, wherein the driving mechanism is provided with a motor and a reducer that is disposed between the base and the movable member and that moves the movable member with respect to the base by reducing the speed of the rotation of the motor, the motor and the reducer are disposed on either side of a securing plate that is secured to the base, the cooling fan is disposed on an opposite side from the securing plate, with the motor interposed between the cooling fan and the securing plate, and generates an airflow that is circulated along a surface of the motor, a space in which a surface of the reducer is exposed is formed outside the reducer, and the securing plate is provided with a vent that is connected to the space by passing through the securing plate in a thickness direction thereof, and through which the airflow generated by the cooling fan passes.

In the above-described aspect, more than one of the vent may be provided in periphery of the motor with spaces therebetween in a circumferential direction.

The above-described aspect may be provided with an airflow-guiding portion that is disposed on an opposite side from the motor with the vent interposed between the airflow-guiding portion and the motor, and that blocks the airflow that is circulated along the surface of the motor and guides the airflow to the vent.

In the above-described aspect, the airflow-guiding portion may be provided over the entire circumference in periphery of the motor.

In the above-described aspect, the airflow-guiding portion may integrally be formed with the securing plate.

DESCRIPTION OF EMBODIMENT

A robot 1 according to an embodiment of the present invention will be described below with reference to the drawings.

Figure 1:
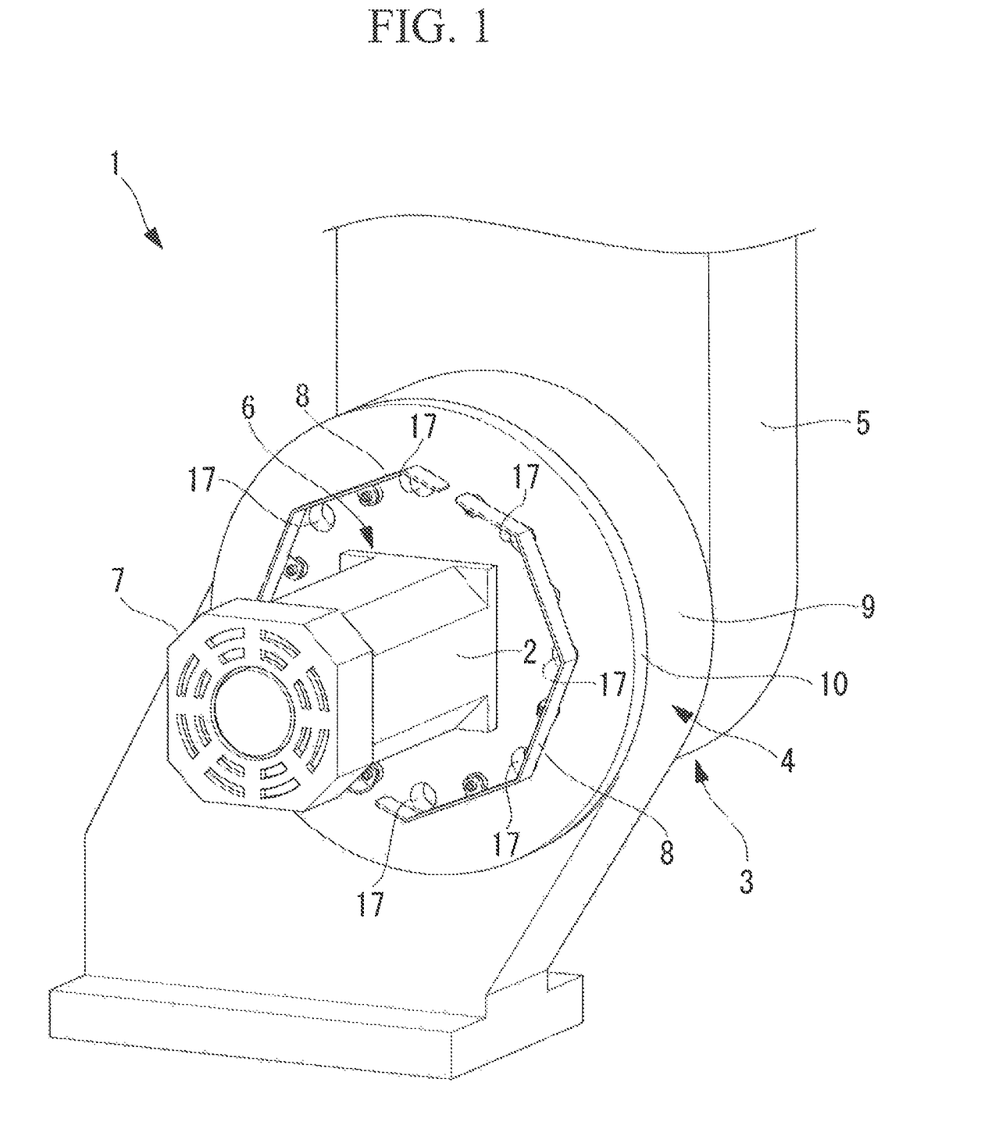
FIG. 1 is a partial perspective view showing a robot according to an embodiment of the present invention

As shown in FIG. 1, the robot 1 according to this embodiment has one or more joints 3 that are driven by a motor 2. FIG. 1 shows, as an example, only one gravity axis among the joints 3 of the robot 1.

Each of these joints 3 is provided with: a base 4; a movable member 5 that is provided so as to be pivotable with respect to the base 4; a driving mechanism 6 that causes the movable member 5 to pivot with respect to the base 4; a cooling fan 7 that cools the driving mechanism 6; and airflow-guiding portions 8.

Figure 2:
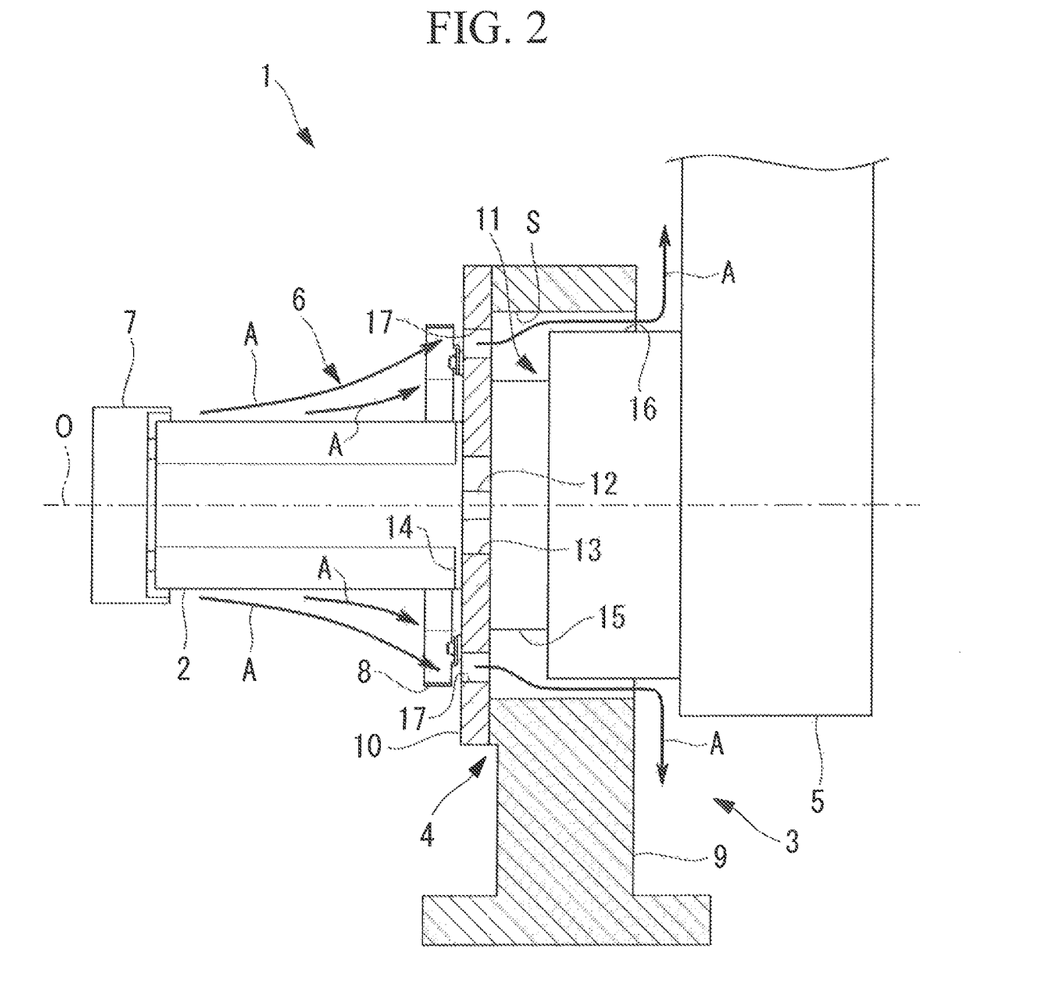
FIG. 2 is a partial longitudinal sectional view showing the robot in FIG. 1.

As shown in FIGS. 1 and 2, the base 4 is provided with a mounting base 9 and a flat-plate-like securing plate 10 that is secured to the mounting base 9. In addition to the form in which the securing plate 10 is formed of a member that is separate from the mounting base 9 and is secured to the mounting base 9 by means of bolts or the like, the securing plate 10 may take a form in which the securing plate 10 is secured to the mounting base 9 by being integrally provided in a portion of the mounting base 9 by means of machining or the like.

The mounting base 9 is provided with an accommodating space (space) S that has a circular lateral sectional shape and that can accommodate a reducer 11 having a substantially columnar form, described later, and the securing plate 10 is secured at a position where the securing plate 10 closes off one end of the accommodating space S in the axial direction.

A center through-hole 13 through which a shaft 12 of the motor 2, described later, is made to pass in the thickness direction is provided at the center of the securing plate 10.

The driving mechanism 6 is provided with the motor 2 and the reducer 11 that transmits the rotation of the motor 2 to the movable member 5 after reducing the speed of the rotation. The motor 2 is provided with a flange portion 14 for securing the motor 2 to one side of the securing plate 10 by means of bolts (not shown). By doing so, the motor 2 is secured in a state in which the shaft 12 is made to pass through the center through-hole 13, and the flange portion 14 is in close contact with the securing plate 10 at one side thereof.

The reducer 11 has a columnar form having an external diameter that is smaller than that of the above-described accommodating space S, is provided with, at one end thereof in an axis-O direction, a securing portion 15 for securing the reducer 11 itself to the securing plate 10 by means of bolts or the like, and is provided, at the other end thereof in the axis-O direction, with an output shaft portion 16 for securing the reducer 11 to the movable member 5. The securing portion 15 is provided, at the center thereof, with an insertion hole (not shown) into which the shaft 12 of the motor 2 is inserted along the axis-O direction.

In other words, the reducer 11 is configured so as to form a substantially cylindrical space between an outer circumferential surface of the reducer 11 and an inner circumferential surface of the accommodating space S by being accommodated in the accommodating space S in which one end thereof is closed off by the securing plate 10 and by securing the securing portion 15 to the securing plated 10.

A gear (not shown) that engages with an input shaft gear (not shown) disposed in the insertion hole of the reducer 11 is secured to the shaft 12 of the motor 2.

The driving mechanism 6 is assembled by, in a state in which the reducer 11 is secured to the securing plate 10 by means of the securing portion 15, inserting the shaft 12 of the motor 2 into the insertion hole via the center through-hole 13 from an opposite side from the reducer 11, with the securing plate 10 interposed between the motor 12 and the reducer 11, by engaging the gear secured to the shaft 12 with the input shaft gear in the insertion hole of the reducer 11, and by securing the motor 2 to the securing plate 10 by using the flange portion 14.

In this embodiment, a plurality of vents 17 are provided in the securing plate 10 with spaces therebetween in the circumferential direction so as to surround the motor 2. The individual vents 17 pass through the securing plate 10 in the thickness direction thereof and are connected to the substantially cylindrical space formed in the periphery of the reducer 11 in the accommodating space S.

The cooling fan 7 is secured to a head portion of the motor 2 and circulates a generated airflow A along a surface of the motor 2 toward the flange portion 14 from the head portion side.

The two airflow-guiding portions 8 are disposed, as a pair, so as to surround the motor 2 over substantially the entire circumference at positions that are radially further outside than the vents 17 are by bending strip-like plate members into arc shapes, and are secured to the securing plate 10 by means of screws or the like.

By doing so, the airflow A that is circulated along the surface of the motor 2 is blocked by the airflow-guiding portions 8 in the process of being circulated so as to be spread radially outward by colliding with the securing plate 10, and is guided so as to pass through the vents 17 in the securing plate 10.

The operation of the thus-configured robot 1 according to this embodiment will be described below.

With the robot 1 according to this embodiment, when the shaft 12 is rotated by actuating the motor 2, the rotation of the shaft 12 is transmitted to the movable member 5 after the speed thereof is reduced by the reducer 11, and thus, the movable member 5 is rotationally moved with respect to the base 4 at a rotational speed that is lower than that of the shaft 12 of the motor 2. Because the torque is amplified as a result of the speed reduction by the reducer 11, it is possible to perform work by moving a load attached to a distal end of the movable member 5.

In this case, although heat is generated in the motor 2 and the reducer 11 due to loss associated with the work, in this embodiment, after cooling the motor 2 by flowing over the surface of the motor 2, the airflow A generated by the cooling fan 7 flows into the substantially cylindrical space at the outer circumference of the reducer 11 by passing through the vents 17 in the securing plate 10 and is circulated in this space. Because the outer circumferential surface of the reducer 11 is exposed in this space, the airflow A also cools the reducer 11.

Figure 5:
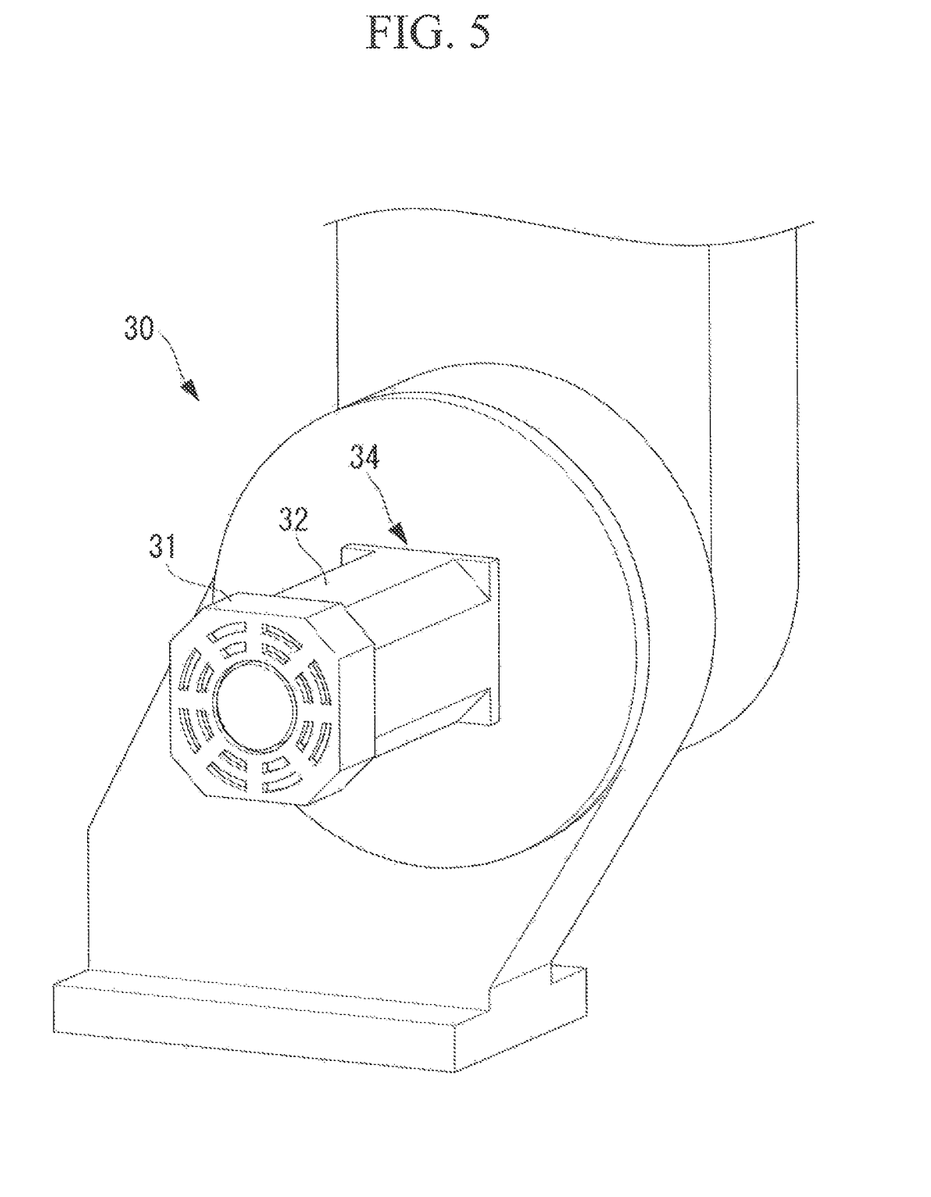
FIG. 5 is a partial longitudinal sectional view for explaining a conventional robot.
Figure 6:
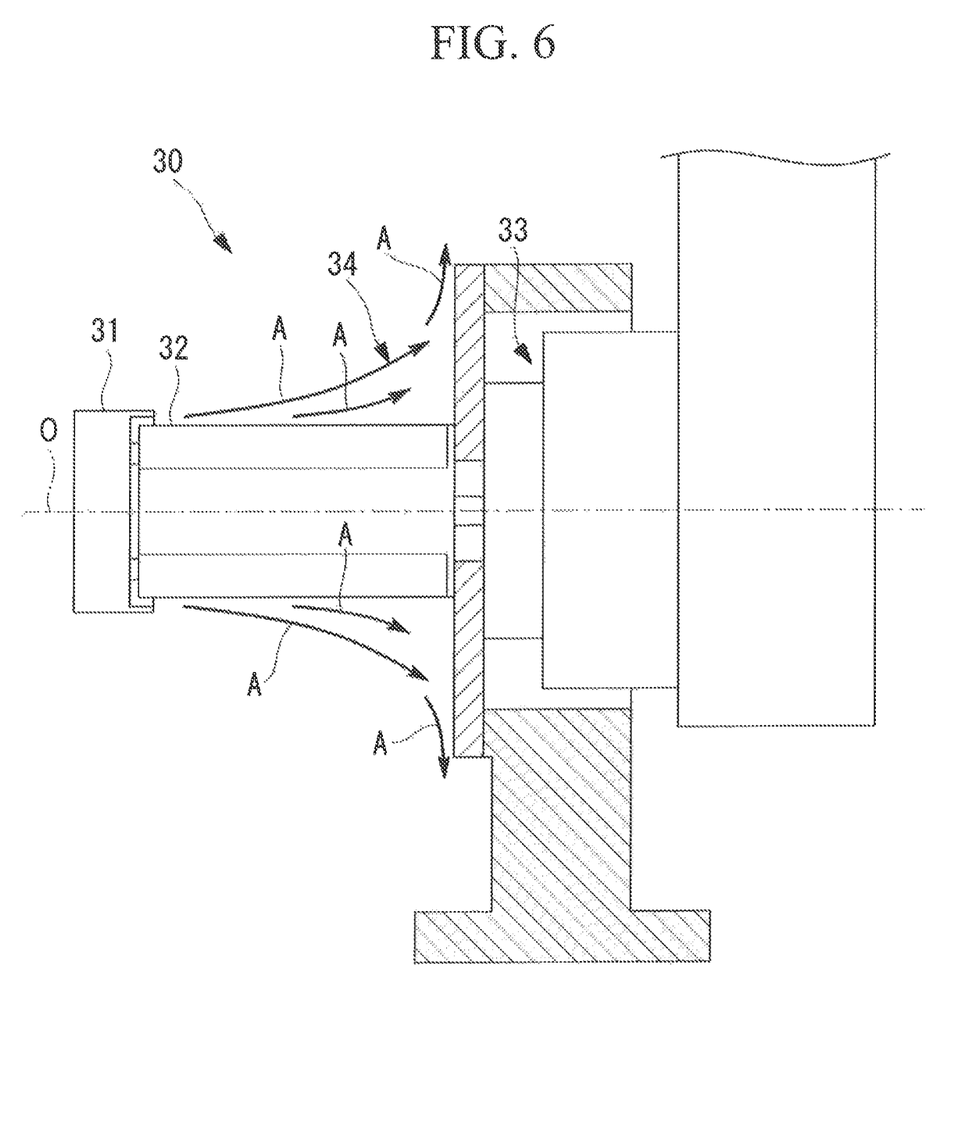
FIG. 6 is a partial longitudinal sectional view of the robot in FIG. 5.

In contrast, as shown in FIGS. 5 and 6, with a conventional robot 30, because an airflow A generated by a cooling fan 31 is circulated only over the surface of a motor 32 and is not circulated in a space in which an outer circumferential surface of a reducer 33 is exposed, cooling of a driving mechanism 34 by the cooling fan 31 is limited to cooling of the motor 32, and the reducer 33 is not cooled.

In other words, with the robot 1 according to this embodiment, because not only the motor 2 but also the reducer 11 is cooled by the airflow A generated by the cooling fan 7, there is an advantage in that, by suppressing an increase in the temperature of the driving mechanism 6 as a whole, it is possible to enhance the durable life of the driving mechanism 6, and it is also possible to enhance the continuous operating capability of the robot 1.

In particular, because the plurality of vents 17 are provided in the securing plate 10 with spaces therebetween in the circumferential direction so as to surround the periphery of the motor 2, the airflow A generated by the cooling fan 7 is branched into the plurality of vents 17, and thus, it is possible to make the airflow A flow over regions of the outer circumferential surface of the reducer 11 with spaces therebetween in the circumferential direction. By doing so, there is an advantage in that it is possible to efficiently cool the entire reducer 11 in a uniform manner.

In this embodiment, because the airflow-guiding portions 8 that block the airflow A generated by the cooling fan 7 are provided, there is an advantage in that it is possible to efficiently cool the reducer 11 by guiding the airflow A to the vents 17 without allowing the airflow A to escape.

Figure 3:
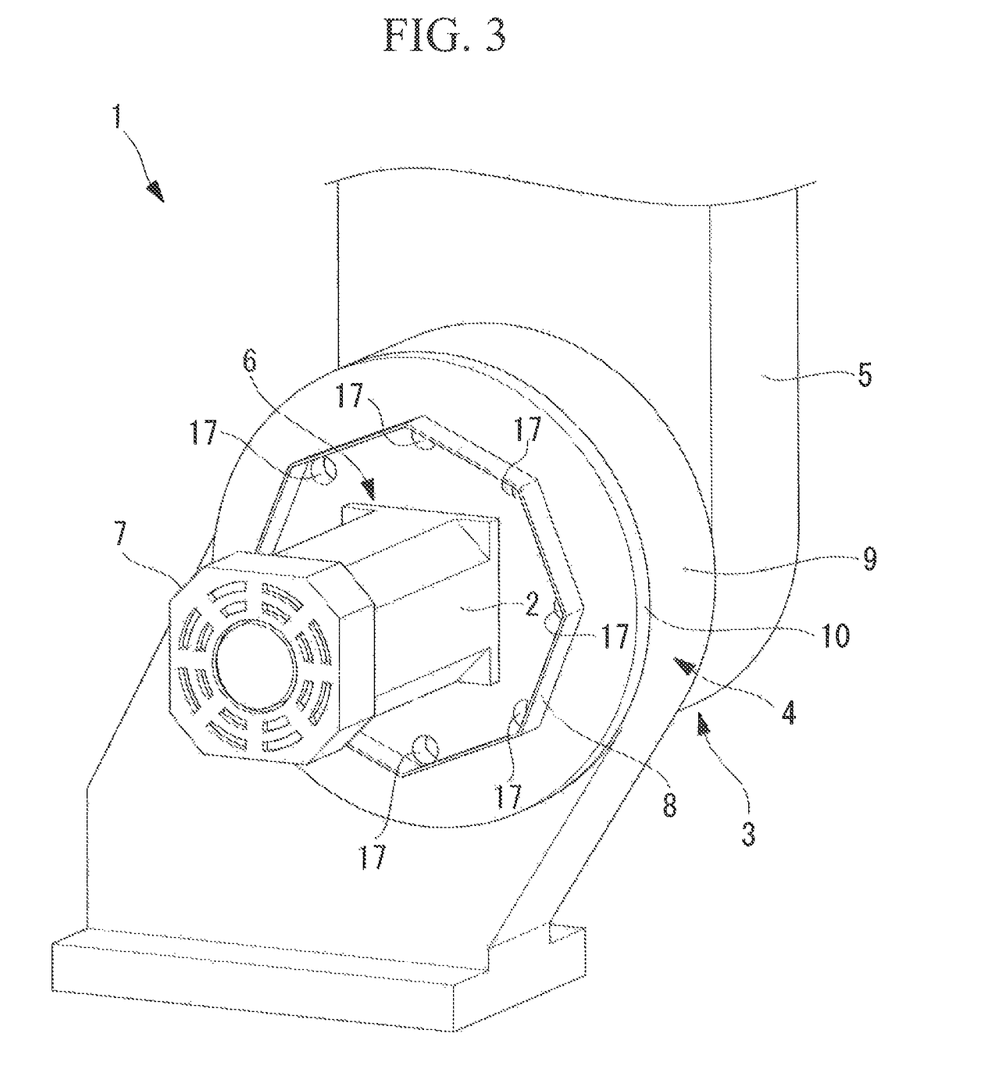
FIG. 3 is a partial perspective view showing a modification of the robot in FIG. 1.
Figure 4:
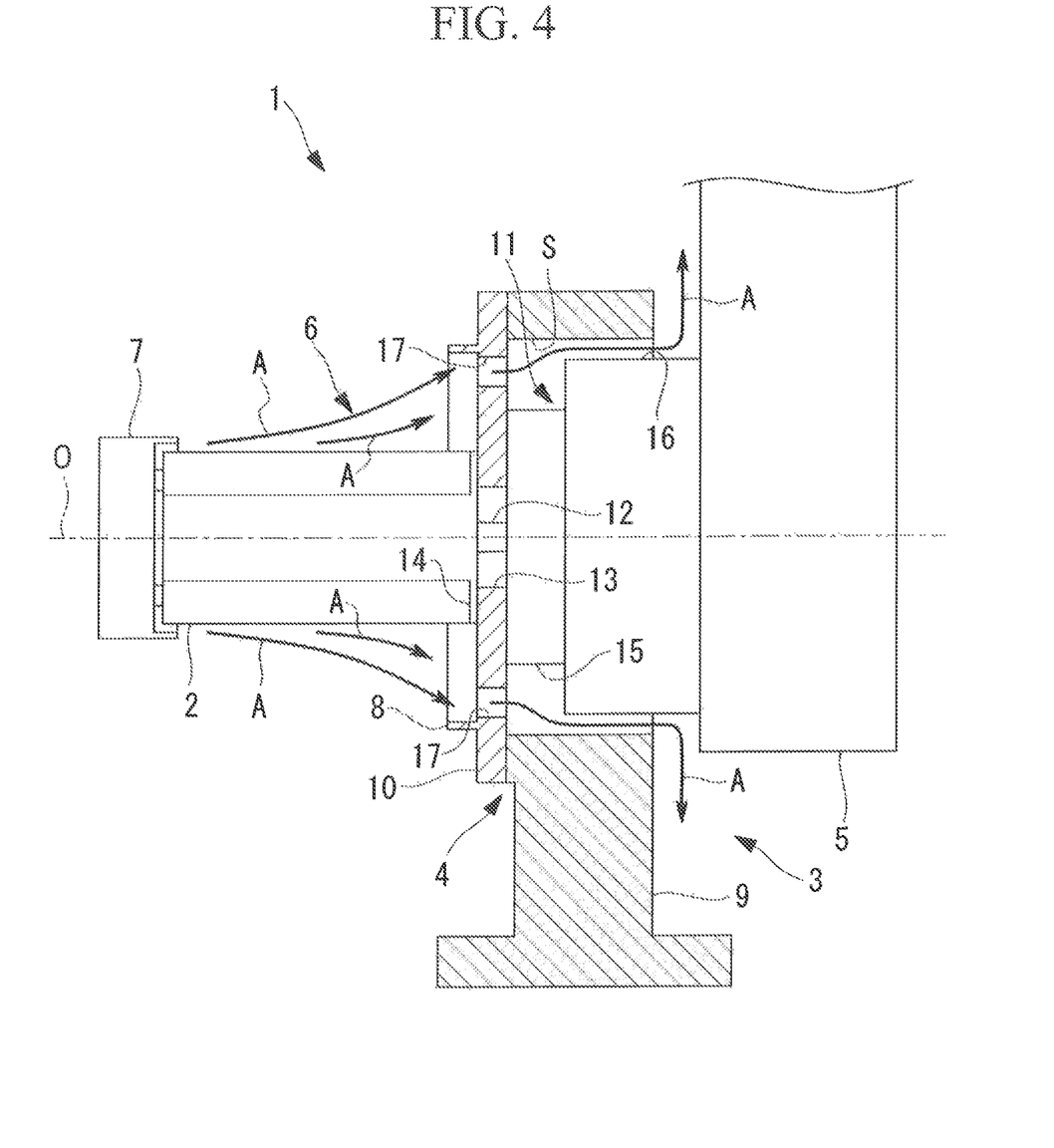
FIG. 4 is a partial longitudinal sectional view of the robot in FIG. 3.

In this embodiment, although the airflow-guiding portions 8 are formed, in the form of strip-like members, as members that are separate from the securing plate 10 and are secured to the securing plate 10 by means of bolts, alternatively, as shown in FIGS. 3 and 4, the airflow-guiding portions 8 may be formed integrally with the securing plate 10 by using portions that protrude therefrom like peripheral walls at the surface of the securing plate 10 on the motor 2 side. By doing so, it is possible to decrease the number of components and reduce costs. In this case, the airflow-guiding portions 8 may be formed of step portions instead of being formed like the peripheral walls.

The number and spacing of the vents 17 may be arbitrary. The vents 17 may be provided at equal spacings or unequal spacings. The shape of the vents 17 may be circular, oval or polygonal.

As a result, the following aspect is read from the above described embodiment of the present invention.

An aspect of the present invention provides a robot including: a driving mechanism that drives a movable member with respect to a base; and a cooling fan that cools the driving mechanism, wherein the driving mechanism is provided with a motor and a reducer that is disposed between the base and the movable member and that moves the movable member with respect to the base by reducing the speed of the rotation of the motor, the motor and the reducer are disposed on either side of a securing plate that is secured to the base, the cooling fan is disposed on an opposite side from the securing plate, with the motor interposed between the cooling fan and the securing plate, and generates an airflow that is circulated along a surface of the motor, a space in which a surface of the reducer is exposed is formed outside the reducer, and the securing plate is provided with a vent that is connected to the space by passing through the securing plate in a thickness direction thereof, and through which the airflow generated by the cooling fan passes.

With this aspect, when the motor of the driving mechanism is driven, the rotation of the motor is transmitted to the movable member after the torque of the motor is amplified by reducing the speed of the rotation by the reducer, and thus, the movable member is moved with respect to the base. The airflow generated by actuation of the cooling fan cools the motor by being circulated along the surface of the motor, and is also circulated in the space formed outside the reducer by passing through the vent provided in the securing plate. Because the surface of the reducer is exposed in this space, the reducer is also cooled by the airflow. By doing so, it is possible to enhance the continuous operating capability by effectively cooling the motor and the reducer, which generate heat by being driven.

In the above-described aspect, more than one of the vent may be provided in periphery of the motor with spaces therebetween in a circumferential direction.

By doing so, after cooling the motor by being circulated along the surface of the motor, the airflow generated by the cooling fan is circulated in the space outside the reducer by being branched by the plurality of vents. By doing so, it is possible to uniformly cool the entire reducer by the airflow that is being circulated along a plurality of regions with spaces therebetween in the circumferential direction.

The above-described aspect may be provided with an airflow-guiding portion that is disposed on an opposite side from the motor with the vent interposed between the airflow-guiding portion and the motor, and that blocks the airflow that is circulated along the surface of the motor and guides the airflow to the vent.

By doing so, because the airflow that is generated by the cooling fan and that is circulated along the surface of the motor is blocked by the airflow-guiding portion and is guided to the vent, it is possible to efficiently cool the driving mechanism including the motor and the reducer by utilizing the airflow without waste.

In the above-described aspect, the airflow-guiding portion may be provided over the entire circumference in periphery of the motor.

By doing so, because the airflow that is generated by the cooling fan and that is circulated along the surface of the motor is blocked by the airflow-guiding portion over the entire circumference, it is possible to efficiently cool the driving mechanism including the motor and the reducer by utilizing the airflow without waste by preventing the airflow from escaping from any location in the circumferential direction.

In the above-described aspect, the airflow-guiding portion may integrally be formed with the securing plate.

By doing so, it is possible to decrease the number of components and to reduce costs.

REFERENCE SIGNS LIST 1 robot
2 motor
4 base
5 movable member
6 driving mechanism
7 cooling fan
8 airflow-guiding portion
10 securing plate
11 reducer
17 vent
A airflow
S space (accommodating space)

The invention claimed is:

1. A robot comprising:
a driving mechanism that drives a movable member with respect to a base; and
a cooling fan that cools the driving mechanism,
wherein the driving mechanism is provided with a motor and a reducer that is disposed between the base and the movable member and that moves the movable member with respect to the base by reducing the speed of the rotation of the motor,
the motor and the reducer are disposed on opposite sides of a securing plate that is secured to the base,
the cooling fan is disposed on an opposite side from the securing plate, with the motor interposed between the cooling fan and the securing plate, and generates an airflow that is circulated along a surface of the motor,
a mounting base secured to the base is provided with an accommodating space formed as a hole in the base with a circular lateral cross section, one end of the accommodating space is closed off by the securing plate, the reducer is disposed inside the accommodating space, and a space in which a surface of the reducer is exposed is formed between an outer circumferential surface of the reducer and an inner circumferential surface of the accommodating space, and
the securing plate is provided with a vent that is connected to the space by passing through the securing plate in a thickness direction thereof, and through which the airflow generated by the cooling fan passes into the accommodating space,
wherein an airflow-guiding portion is formed by strip-shaped plate members and is disposed so as to surround the motor and the vent at positions that are radially further outside than the vent, and blocks the airflow that is circulated along the surface of the motor and guides the airflow to the vent and into the accommodating space.

2. The robot according to claim 1, wherein the vent comprises a plurality of vents, and the plurality of vents are provided around the motor with an interval therebetween in a circumferential direction.

3. The robot according to claim 1, wherein the airflow-guiding portion is provided around the entire circumference around the motor.

4. The robot according to claim 1, wherein the airflow-guiding portion is integrally formed with the securing plate.

* * * * *